United States Patent [19]

Brown et al.

[11] Patent Number: 5,224,649
[45] Date of Patent: Jul. 6, 1993

[54] DIGITAL THERMOSTAT WITH SINGLE ROTARY ENCODER SWITCH FOR ESTABLISHING SET POINT TEMPERATURE

[75] Inventors: Bernard T. Brown; William P. Butler, both of St. Louis, Mo.

[73] Assignee: Emerson Electric Co., St. Louis, Mo.

[21] Appl. No.: 8,836

[22] Filed: Jan. 25, 1993

Related U.S. Application Data

[63] Continuation of Ser. No. 856,394, Mar. 23, 1992, abandoned.

[51] Int. Cl.[5] .................................................. G05D 23/00
[52] U.S. Cl. ........................................ 236/94; 165/26; D10/50; 116/309
[58] Field of Search .................... 236/94; 62/125, 126, 62/127, 160; 165/11.1, 26; 116/245, 254, 284, 309; 200/11 TW; D10/50, 51; 337/79, 376

[56] References Cited

U.S. PATENT DOCUMENTS

| | | | |
|---|---|---|---|
| 3,366,751 | 1/1968 | Capellari | 200/11 TW |
| 3,942,718 | 3/1976 | Palmieri | 236/78 R |
| 4,163,879 | 8/1979 | Mayer et al. | 200/11 TW |
| 4,314,666 | 2/1982 | Schotten | 62/126 X |
| 4,364,428 | 12/1982 | Ohtsu et al. | 236/94 X |
| 4,568,927 | 2/1986 | Fowler | 200/11 TW |
| 4,669,654 | 6/1987 | Levine et al. | 236/46 R |
| 4,841,738 | 6/1989 | Katsuki et al. | 62/160 |
| 4,898,230 | 2/1990 | Tsuchiyama et al. | 236/94 X |

Primary Examiner—Harry B. Tanner
Attorney, Agent, or Firm—Paul A. Becker, Sr.

[57] ABSTRACT

A digital thermostat includes a microcontroller and a single rotary encoder switch having an adjusting shaft and a knob connected to the shaft. The shaft of the switch is rotatable by the knob to a plurality of discrete angular positions, each of which enables the switch to provide a unique signal to the microcontroller. Each unique signal is interpreted by the microcontroller so as to establish a desired set point temperature. Each discrete angular switch position also effects a visual display, through an opening in the thermostat cover, of the desired set point temperature.

1 Claim, 4 Drawing Sheets

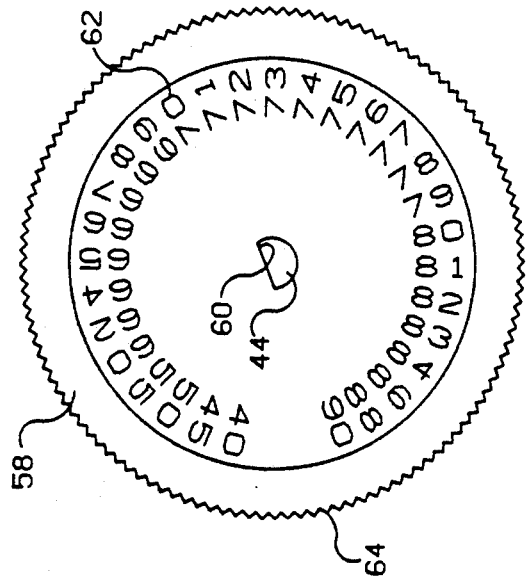
FIG. 2
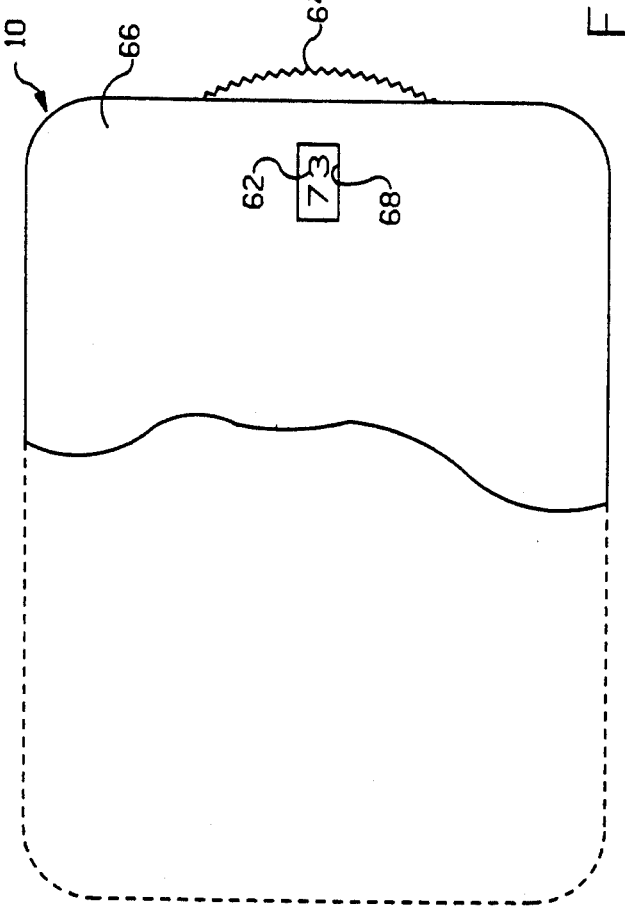
FIG. 1
FIG. 3
| | LOOK-UP TABLE | |
|---|---|---|
| | INDEX REGISTER | SET POINT |
| | 0000/0000 | 0010/1000 |
| | 0000/0001 | 0100/1001 |
| | 0000/0010 | 0010/1101 |
| | 0001/1110 | 0101/0100 |
| | 0001/1111 | 0100/1111 |
| ANGULAR SWITCH POSITION | (SET POINT) | PORT A | | | | |
|---|---|---|---|---|---|---|
| | | PA4 | PA3 | PA2 | PA1 | PA0 |
| 1 | (40°F.) | 0 | 0 | 0 | 0 | 0 |
| 16 | (73°F.) | 0 | 0 | 0 | 0 | 1 |
| 2 | (45°F.) | 0 | 0 | 0 | 1 | 0 |
| 27 | (84°F.) | 1 | 1 | 1 | 1 | 0 |
| 22 | (79°F.) | 1 | 1 | 1 | 1 | 1 |

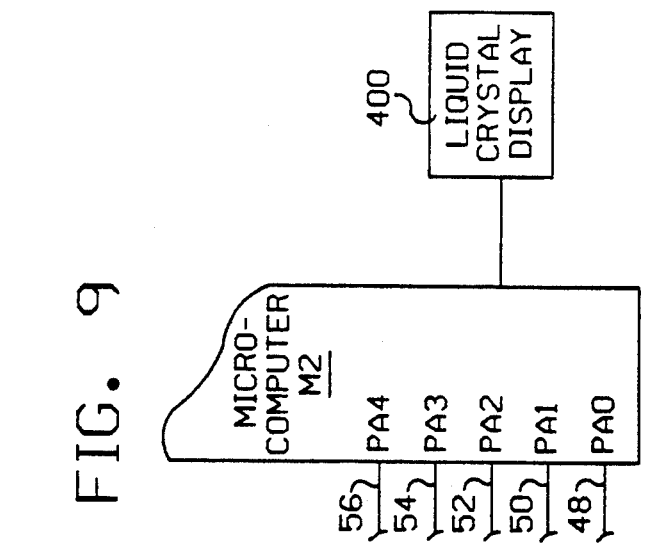
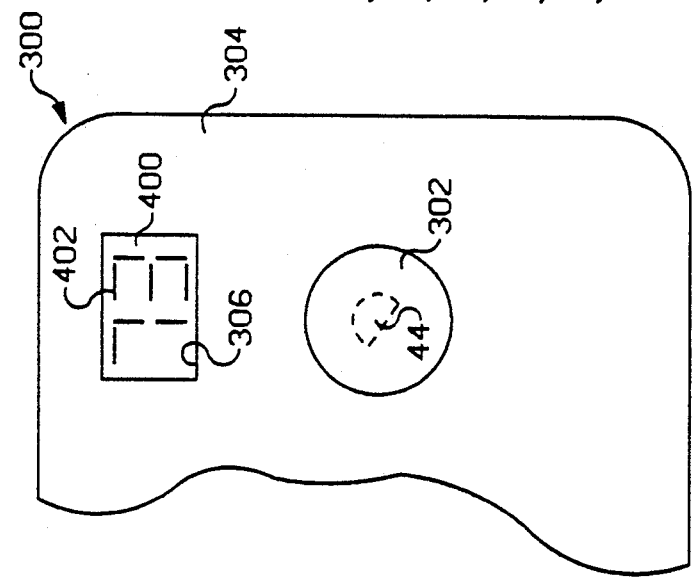
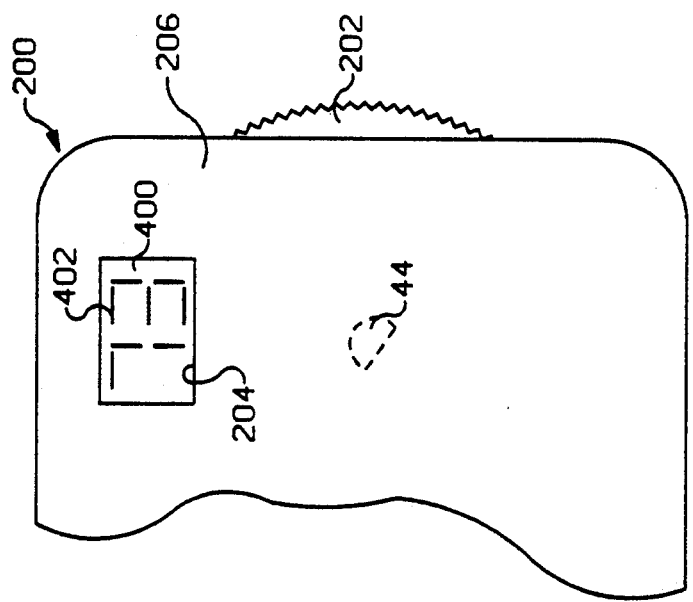

DIGITAL THERMOSTAT WITH SINGLE ROTARY ENCODER SWITCH FOR ESTABLISHING SET POINT TEMPERATURE

This application is a continuation of application Ser. No. 856,394, filed Mar. 23, 1992, abandoned.

BACKGROUND OF THE INVENTION

This invention relates to digital thermostats which control operation of heating and/or cooling apparatus, and particularly to an improved means for establishing a desired set point temperature in such thermostats.

For many years, thermostats for controlling heating and/or cooling apparatus have incorporated a bi-metal sensitive to room temperature, a switching means carried by the bi-metal, which switching means controls operation of the heating and/or cooling apparatus, and a lever or knob mechanically linked to the bi-metal. Associated with the lever or knob is some type of temperature indexing means. The arrangement is such that the user can establish a desired set point temperature at which the thermostat is to effect energizing or de-energizing of the heating and/or cooling apparatus by simply manually adjusting the lever or knob so as to visually indicate the desired set point temperature.

In recent years, a wide variety of thermostats have been developed which have the capability of being programmed by the user to provide a time-temperature schedule whereby the thermostat will automatically control room temperature at different set point temperatures during different time periods of the day and week. Many of such programmable thermostats incorporate a microcontroller which provides digital logic. The microcontroller provides a cost-effective means for implementing the desired functions of such thermostats. The microcontroller, primarily because of its digital logic, also enables such thermostats to provide more accurate and reliable control of room temperature than can generally be achieved by the aforementioned bi-metal type.

While such programmable digital thermostats have been widely accepted in the marketplace, there still remains a segment of homeowners who, while desirous of the accuracy and reliability in controlling room temperature due to the use of a microcontroller in such thermostats, prefer a thermostat in which the set point temperature can be adjusted manually, and in a simple manner, for example, similar to that used in the aforementioned bi-metal types, instead of it being adjusted automatically in accordance with a programmed time-temperature schedule. While the key pads, slide switches, buttons, knobs and other such means utilized for programming the typical programmable digital thermostat may be manipulated quite simply to negate the automatic time-temperature operation and provide for manual adjustment of the set point temperature, such homeowners are often intimidated by the extent of such manipulation and/or by the overall complexity of such thermostats.

Therefore, it would be desirable to provide a non-programmable thermostat utilizing a microcontroller so as to implement the accuracy and reliability provided by the microcontroller, and utilizing a simple, easy-to-understand means for establishing a desired set point temperature.

SUMMARY OF THE INVENTION

It is, therefore, a primary object of this invention to provide a generally new and improved digital thermostat with improved means for establishing a desired set point temperature.

A further object is to provide a digital thermostat wherein a single rotary encoder switch is utilized for establishing a desired set point temperature.

In accordance with the present invention, a digital thermostat includes a microcontroller and a single rotary encoder switch The shaft of the switch is rotatable to a plurality of discrete angular positions, each of which enables the switch to provide a unique signal to the microcontroller. Each unique signal is interpreted by the microcontroller so as to establish a desired set point temperature. The microcontroller compares data related to the desired set point temperature with data representative of sensed temperature to provide output signals effective to control heating and/or cooling apparatus. A temperature adjusting knob is connected to the rotatable shaft of the switch. In accordance with a first embodiment of the present invention, the knob is indexed with integers representing potential set point temperatures, and the integer representing the instant set point temperature is visible through an opening in the thermostat cover. A peripheral portion of the knob extends slightly outside of the cover so as to provide convenient means for adjusting the set point temperature.

In accordance with a second embodiment of the present invention, a knob is used which is the same as the knob used in the first embodiment except it has no integers. The instant set point temperature is displayed through an opening in the thermostat cover by means of an optical display driven by the microcontroller.

In accordance with a third embodiment of the present invention, a knob having no integers and completely external to the thermostat is utilized. As in the second embodiment, the instant set point temperature is displayed through an opening in the thermostat cover by means of an optical display driven by the microcontroller.

The above-mentioned and other objects and features of the present invention will become apparent from the following description when read in conjunction with the accompanying drawings.

BRIEF DESCRIPTION OF THE DRAWINGS

FIG. 1 is a partial front elevation view of a thermostat incorporating the present invention;

FIG. 2 is a plan view of a temperature indexed knob associated with a rotary encoder switch utilized in the thermostat of FIG. 1;

FIG. 3 is a table illustrating the correlation between angular positions of the rotary encoder switch and a microcontroller in the thermostat of FIG. 1;

FIG. 7 is a partial front elevation view of a thermostat incorporating a second embodiment of the present invention;

FIG. 8 is a partial front elevation view of a thermostat incorporating a third embodiment of the present invention; and FIG. 9 is a partial circuit diagram showing the connection of a liquid crystal display (LCD) and a microcontroller utilized in the thermostats of FIGS. 8 and 9.

DESCRIPTION OF THE PREFERRED EMBODIMENT

Figure 4:
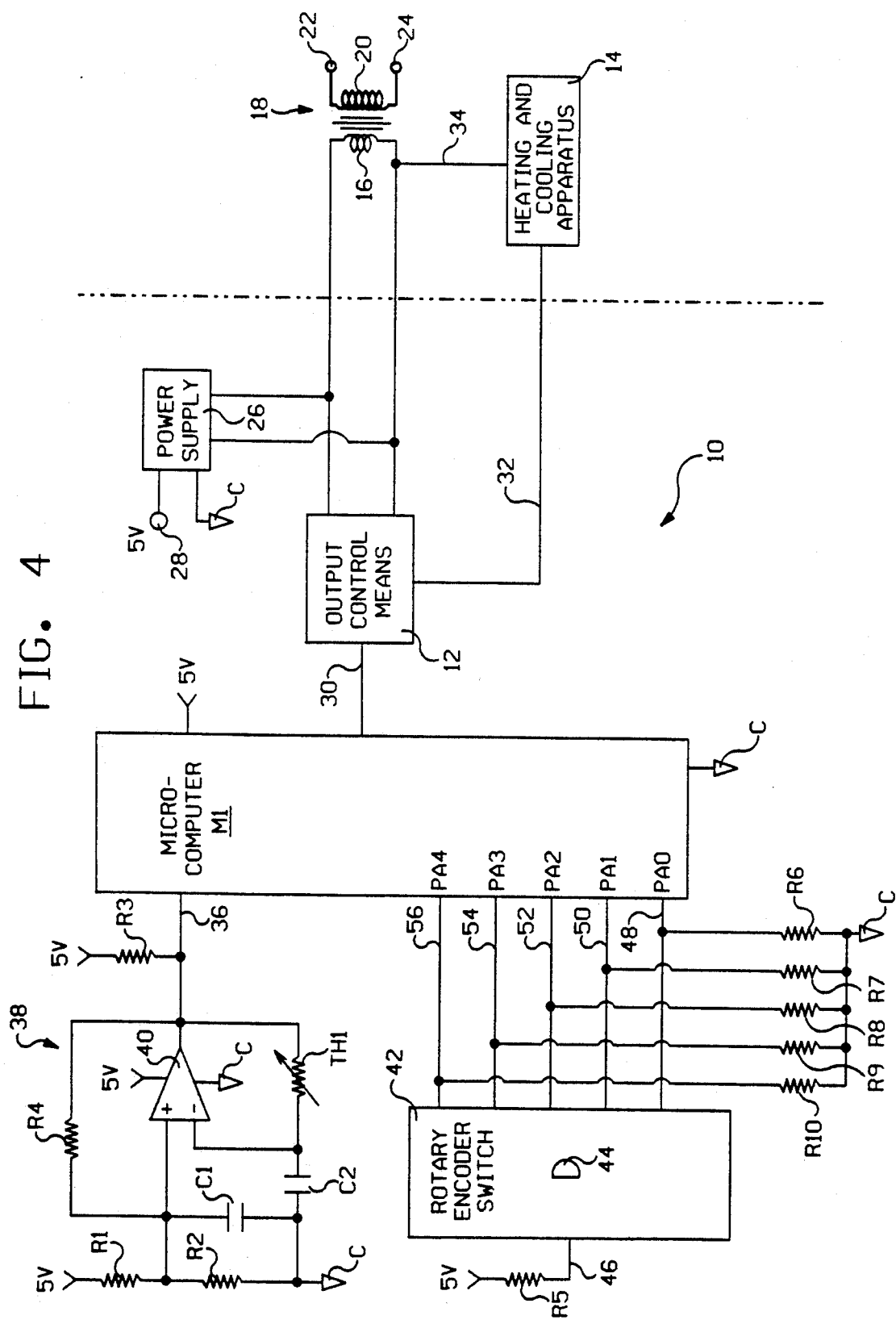
FIG. 4 is a circuit diagram, largely in block form, of the thermostat of FIG. 1 and shown connected to a heating and cooling apparatus.

Referring to FIG. 4, a first embodiment of the present invention is incorporated in a thermostat shown generally at 10. Thermostat 10, through output control means 12, is adapted to control operation of heating and cooling apparatus 14. Apparatus 14 can take many forms, a typical one of which includes a relay for controlling a gas valve, a relay for controlling a circulator fan, and a contactor for controlling a compressor. Output control means 12 in thermostat 10 can take many forms, a typical one of which includes relays, a system selector switch, and a fan switch.

Output control means 12 is connected across the secondary winding 16 of a voltage step-down transformer 18. The primary winding 20 of transformer 18 is connected across terminals 22 and 24 of a conventional 120 volt alternating current power source. A power supply 26 is also connected across secondary winding 16, and is effective to provide a 5 volt output at an output terminal 28.

Thermostat 10 includes a microcontroller in the form of a microcomputer M1. Preferably, microcomputer M1 is an MC68HC05J1 made by Motorola. While microcomputer M1 is the preferred form of the microcontroller, it is to be understood that the microcontroller could alternatively comprise other types of digital logic devices. For example, the microcontroller could comprise a so-called Application Specific Integrated Circuit (ASIC).

Microcomputer M1 is connected by connecting means 30 to output control means 12. Typically, connecting means 30 comprises a plurality of electrical leads, some of which are connected to input pins of microcomputer M1 so as to provide data such as that relating to system switch selection, and some of which are connected to output pins of microcomputer M1 so as to provide for operation of output control means 12 in accordance with logic programmed into and executed by microcomputer M1. Output control means 12 is connected to apparatus 14 by connecting means 32, and apparatus 14 is connected by connecting means 34 to secondary winding 16.

Connected to microcomputer M1 by a lead 36 is a temperature sensing circuit 38. Circuit 38 comprises resistors R1, R2, R3, and R4, capacitors C1 and C2, a thermistor TH1, and an LM393 comparator 40 connected as shown to effect the generation of a squarewave signal on lead 36 whose frequency is a function of the temperature sensed by thermistor TH1.

Also connected to microcomputer M1 is a rotary encoder switch 42. Switch 42 comprises an arrangement of movable contacts and stationary contacts enclosed in a suitable housing. The movable contacts are mechanically linked to a rotatable shaft 44 and electrically connected by a lead 46 and through a resistor R5 to the 5 volt power source provided by power supply 26. The stationary contacts are electrically connected by leads 48, 50, 52, 54, and 56 to input pins PA0, PA1, PA2, PA3, and PA4, respectively, of microcomputer M1. Resistors R6, R7, R8, R9, and R10 are connected between leads 48, 50, 52, 54, and 56, respectively, and common C.

Referring to FIG. 2, a knob 58 is connected to shaft 44 of switch 42. Preferably, knob 58 is provided with a flatted opening 60 therein whereby such connection is an interference fit. Knob 58 is provided with integers 62 which are spaced radially outwardly from opening 60. The integers 52 represent temperature in °F. (degrees Fahrenheit). The integers 62 are marked as 40, 45, 50, 55, 60, 62, 64 through 84 in consecutive integers, 86, 88, and 90. The periphery 64 of knob 58 is serrated so as to accommodate manual adjustment of knob 58. Specifically, referring to FIG. 1, thermostat 10 is provided with a cover 66. Cover 66 is provided with a rectangular opening 68 through which one of the integers 62 is visible. The serrated periphery 64 of knob 58 extends slightly beyond cover 66 thereby providing the user with a convenient means for adjusting knob 58.

Switch 42 is constructed internally in such a manner so as to provide 30 discrete angular positions. Each discrete position results in a unique connection of the movable and stationary contacts in switch 42. Basically, when a stationary contact is connected to the movable contact, a voltage appears on the electrical lead connected to that stationary contact; when a stationary contact is not connected to the movable contact, there is no voltage on the electrical lead connected to that stationary contact. For example, when the movable contact is in contact with the stationary contact connected to lead 48, the 5 volt source provides for a current flow through resistor R5, the movable and stationary contacts, lead 48, and resistor R6 to common C. Such current flow causes a voltage to appear on lead 48. When the movable contact is not in contact with the stationary contact connected to lead 48, there is no current flow through lead 48 whereby there is no voltage on lead 48. Microcomputer M1 interprets such voltage or no voltage condition as a digital high or digital low, respectively, at input pin PA0. In the same manner, microcomputer M1 responds to such voltage or no voltage condition at pins PA1, PA2, PA3, and PA4. As will hereinafter be described, microcomputer M1 interprets the composite signal at these input pins as a designation of the desired set point temperature.

For example, referring to FIGS. 3 and 4, when switch 42 is in angular switch position 1, none of the stationary contacts are connected to the movable contact. In this switch position, there is no voltage on leads 48, 50, 52, 54, and 56 so that the signals to input pins PA0, PA1, PA2, PA3, and PA4, respectively, are digitally low (designated as binary zero). When switch 42 is in this switch position, microcomputer M1 loads the signals 0, 0, 0, 0, and 0 appearing at pins PA4, PA3, PA2, PA1, and PA0, respectively, into its accumulator and then stores the accumulator value in an index register in binary form of 0000/0000. By means of a look-up table in ROM of microcomputer M1, the value 0000/0000 in the index register locates a set point temperature, in binary form. As illustrated in FIG. 3, the set point temperature located by index register 0000/0000 is 0010/1000 which is 40° F. in binary form. Microcomputer M1 loads the set point temperature, in binary form, into its accumulator and then stores it in RAM for further processing as will hereinafter be described.

The integers 62 on knob 58 are oriented such that the specific set point temperature established by the specific angular switch position is visible through opening 68 of cover 66. Thus, referring to FIGS. 1, 2 and 3, when knob 58 is rotated to establish switch position 16, indicative of a set point temperature of 73° F., the integer 73 is visible through opening 68.

As is apparent in FIG. 3, the signals at pins PA4, PA3, PA2, PA1, and PA0 are not sequential with the set point temperatures. For example, angular switch position 2 establishes the next set point temperature after 40° F., namely, 45° F. However, the signal appearing at pins PA4, PA3, PA2, PA1, and PA0 at angular switch position 2 is 0, 0, 0, 1, and 0, respectively, which is not the next sequential binary designation after the designation 0, 0, 0, 0, and 0 which was the binary designation associated with angular switch position 1. Such a scrambled code, sometimes referred to as a Gray code, enables switch 42 to be constructed, with regard to the movable and stationary contacts connections, in a cost-effective manner.

In operation, assume that it is desired to establish a set point temperature of 68° F. Accordingly, the user simply adjusts knob 58, by means of the serrated periphery 64 thereof, until the integer 68 is visible through opening 68 of cover 10. In the manner previously described, encoder switch 42 provides a unique signal to pins PA4, PA3, PA2, PA1, and PA0 to enable microcomputer M1, by means of its look-up table and in accordance with step 100 in FIG. 5, to establish and store in RAM the binary form of the set point temperature of 68° F. Referring to step 102 in FIG. 5 and to FIG. 6, microcomputer M1 then establishes a lower trip point, defined as 68 3/16° F., and an upper trip point, defined as 68 12/16° F., both of which are established in binary form.

As previously described, temperature sensing circuit 8 provides a square-wave output signal whose frequency is a function of the temperature sensed by thermistor TH1. Microcomputer M1 includes a counter, as shown by block 104 in FIG. 5, which is effective to count the number of square-wave pulses in a specific predetermined time period, such as 1 second. The number of pulses so counted is then modified by correction factors, as shown in block 106, to correct for variations such as due to non-linearity of thermistor TH1. The counted pulses are also modified by an anticipation function as shown by block 108. Basically, the anticipation function modifies the counted pulses in such a manner so as to minimize undershoot and overshoot of the room temperature with respect to the set point temperature. The resultant count is identified, as shown in block 110, as buffered temperature BT, and is stored in RAM in binary form.

Figure 5:
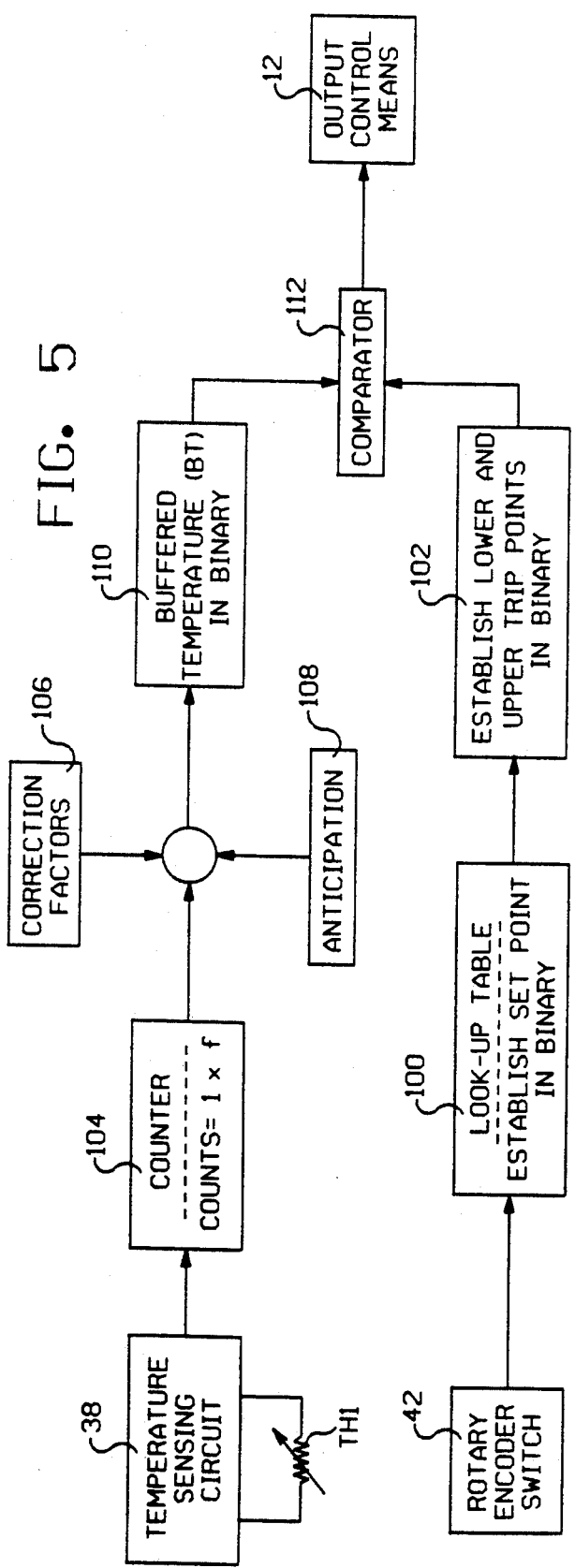
FIG. 5 is an illustration, in block form, of circuitry and functions embodied in the thermostat of FIG. 1.
Figure 6:
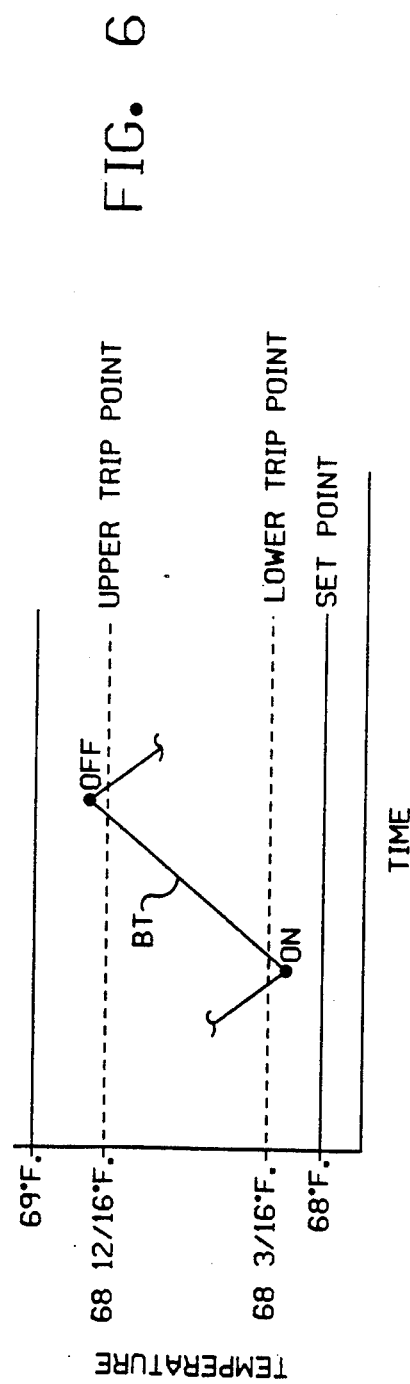
FIG. 6 is a chart illustrating cycling characteristics of the thermostat of FIG. 1.

Microcomputer M1 then compares, as shown in block 112, the buffered temperature BT with the lower and upper trip points. Referring to FIGS. 5 and 6, and in reference to a heating mode, when the buffered temperature BT rises slightly above the upper trip point of 68 12/16° F., microcomputer M1 provides a signal to output control means 12 to de-energize the heating apparatus; when the buffered temperature BT drops slightly below the lower trip point of 68 3/16° F., microcomputer M1 provides a signal to output control means 12 to energize the heating apparatus. With thermostat 10 in a cooling mode, operation would be similar but reversed.

Referring to FIGS. 7 and 9, wherein like numerals are utilized where applicable, a second embodiment of the present invention is incorporated in a thermostat 200. In thermostat 200, a temperature adjusting knob 202 is the same as knob 58 of thermostat 10 except knob 202 has no integers. Knob 202 is connected to shaft 44 of rotary encoder switch 42 in the same manner as previously described regarding knob 58. Thermostat 200 includes a liquid crystal display (LCD) 400 which establishes integers 402 visible through a rectangular opening 204 of cover 206.

LCD 400 is connected to a microcontroller in the form of a microcomputer M2 as shown in FIG. 9. As was previously stated with regard to microcomputer M1, the microcontroller in FIG. 9 could alternatively comprise other types of digital logic devices such as an ASIC. Microcomputer M2, preferably an MC68HC05L6 made by Motorola, includes therein a driver circuit for LCD 400. Except for the additional function of driving LCD 400, microcomputer M2 provides the same functions and in the same manner as provided by microcomputer M1.

In thermostat 200, the desired set point temperature is established in microcomputer M2 in the same manner as was previously described for microcomputer M1 in thermostat 10. Accordingly, when knob 202 is rotated to establish a specific angular switch position, for example, position 16 of FIG. 3, which switch position is indicative of a set point temperature of 73° F., encoder switch 42 provides a unique signal to pins PA4, PA3, PA2, PA1, and PA0, referring to FIG. 9, to enable microcomputer M2, by means of its look-up table, to establish and store in RAM the binary form of the set point temperature of 73° F. Microcomputer M2 then drives LCD 400 so as to effect a display of the integer 73. Microcomputer M2 then processes such set point temperature data and data representative of sensed temperature in the same manner as previously described for microcomputer M1.

Referring to FIG. 8, wherein like numerals are utilized where applicable, a third embodiment of the present invention is incorporated in a thermostat 300. In thermostat 300, a temperature adjusting knob 302 is provided. Knob 302 is connected through an opening (not shown) in cover 304 to shaft 44 of rotary encoder switch 42 in any convenient manner. Thermostat 300 also utilizes microcomputer M2. Thermostat 300 also includes LCD 400 which establishes integers 402 visible through a rectangular opening 306 of cover 304. Knob 302 establishes the desired set point temperature in the same manner as was previously described regarding knob 202 of thermostat 200. Also, in thermostat 300, microcomputer M2 processes such set point temperature data and data representative of sensed temperature in the same manner as previously described for microcomputer M1.

While the use of LCD 400 is the preferred form of optical display of the set point temperature in thermostats 200 and 300, it is to be understood that, with minor circuit changes, light emitting diodes could alternatively be used.

While the invention has been illustrated and described in detail in the drawings and foregoing description, it will be recognized that many changes and modifications will occur to those skilled in the art. It is therefore intended, by the appended claims, to cover any such changes and modifications as fall within the true spirit and scope of the invention.

We claim:

1. In a digital thermostat for controlling operation of heating and/or cooling apparatus,
   a microcomputer;

temperature sensing means connected to said microcomputer for providing a signal thereto representative of sensed temperature;

rotary encoder switch means comprising a single rotary encoder switch connected to said microcomputer and having an adjusting shaft and a knob connected to said shaft; and a cover having an opening therein, said knob being indexed with a plurality of integers defining a non-linear temperature scale, each of said integers representing a potential set point temperature, said shaft of said switch being rotatable by said knob to a plurality of discrete angular positions, each of said angular positions being effective to enable said switch to provide a unique signal to said microcomputer representative of a singular desired set point temperature applicable to operation of said heating and/or cooling apparatus, said microcomputer being effective to interpret said unique signal so as to establish said singular desired set point temperature, said each of said angular positions further effecting a visual display, through said opening in said cover, of a specific one of said integers which identifies said singular desired set point temperature, said microcomputer being further effective for processing said signal representative of sensed temperature and said unique signal representative of said singular desired set point temperature so as to provide an output signal effective to control said heating and/or cooling apparatus.

* * * * *